May 5, 1959     C. D. TICER     2,884,735

LEADER WITH RELEASABLE SINKER

Filed March 1, 1957

Cecil D. Ticer
INVENTOR.

United States Patent Office 2,884,735
Patented May 5, 1959

2,884,735

LEADER WITH RELEASABLE SINKER

Cecil D. Ticer, Everett, Wash.

Application March 1, 1957, Serial No. 643,306

1 Claim. (Cl. 43—43.12)

The present invention relates, broadly interpreted to fishing tackle and has reference to a sinker having a flexible element whereby the sinker may be detachably and releasably connected with a trippable fish actuated link which is interposed between the fishing line and leader.

The idea of equipping a fishing line with a pull released sinker or weight is not new. Reference may be had for instances of prior adoption and use to such patents as Pomercy 1,033,464 of July 23, 1912 and Grobl et al. 2,735,211 of February 21, 1956. Revealed therein are sinker supporting and releasing devices whereby a sinker may be detached or released when trolling to enable a fisherman who is fond of fishing with a light rod and cares to play the fish without encumbrance from the sinker to do so. Whereas sectional sinker release devices no doubt perform in keeping with the expectations of the prior patentees, it is believed that a better solution of the problem is to provide a simple, rigid one-piece supporting and releasing link, and this is what is being done here and is being offered as an advance in the art.

As will be evident, the object of the present invention is to provide a simpler and more economical support and release link which makes it possible to utilize a simple slot intermediate the ends of the link, thus providing a keeper notch and which latter serves to accommodate a loop on the cooperating end of a flexible element carrying the weight or sinker.

Other objects, features and advantages will become more readily apparent from the following description and the views in the accompanying sheet of drawings.

Figure 1:
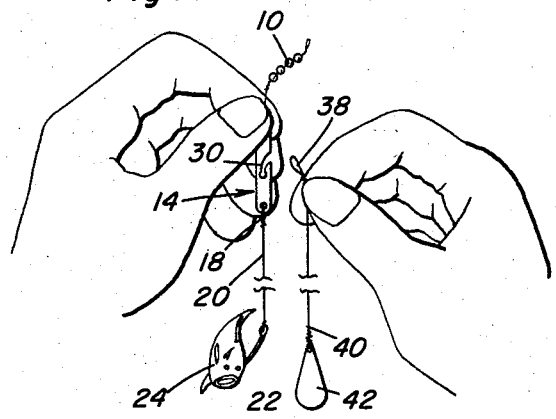
Fig. 1 is a view in perspective and on a small scale showing the invention and how the looped end of the sinker attaching element is attached.
Figure 2:
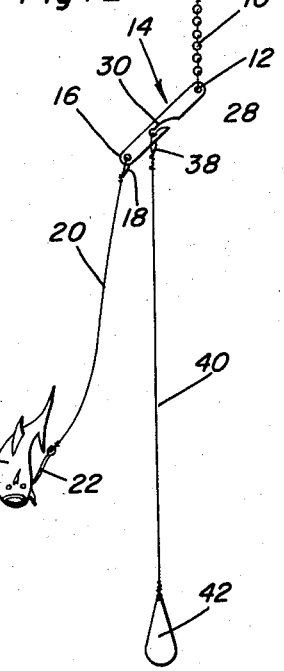
Fig. 2 is an elevational view of the complete, ready-to-use tackle with the sinker attached.
Figure 3:
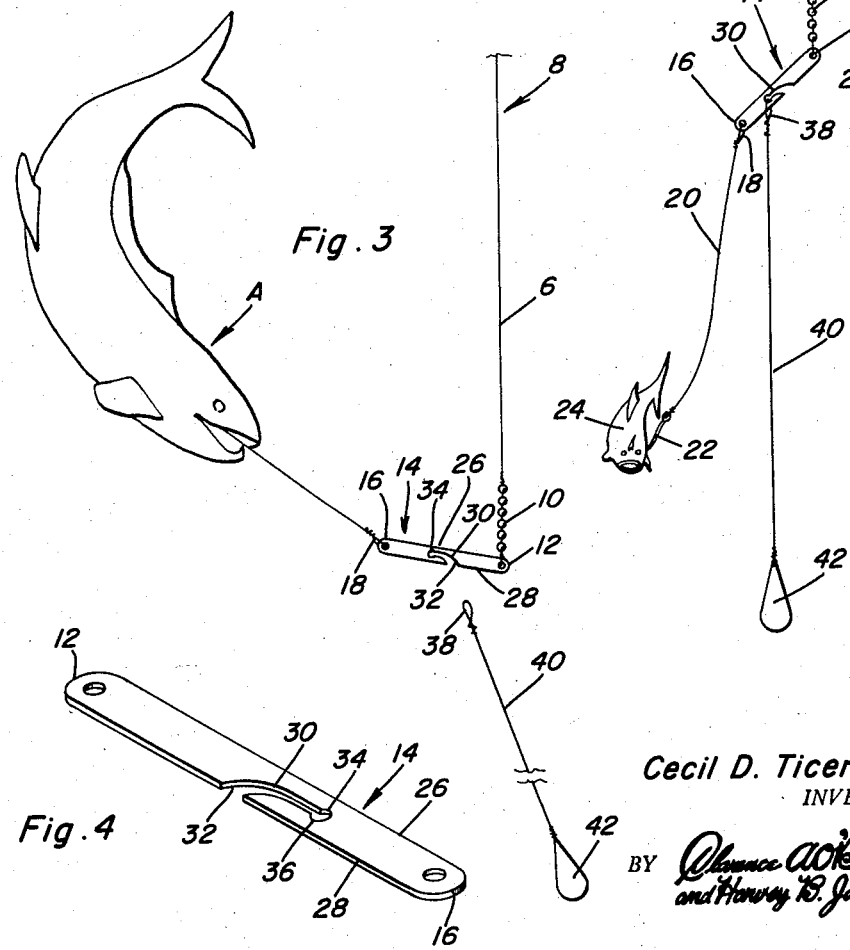
Fig. 3 is a view similar to and based on Fig. 2, but showing the manner in which the hooked fish succeeds in swinging the link to a sinker releasing and dropping position.
Figure 4:
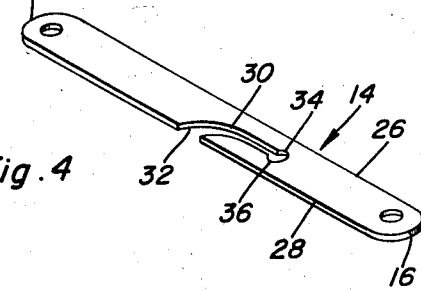
Fig. 4 is a perspective view on a larger scale of the link by itself.

With reference to Fig. 2, the lower end portion 6 of the conventional fishing line 8 is shown provided with swivel means 10 attached to the upper apertured end 12 of the line and leader connecting link and sinker release. This link is here denoted by the numeral 14 and is a simple, rigid, flat-faced strip member, the lower apertured end 16 of which is connected by a ring or the like 18 to the upper end of a leader 20. A conventional fish hook 22 is attached to the lower end of the leader and is provided with suitable bait 24. The opposite longitudinal edge portions 26 and 28 of the link are straight and therefore the link, which is also flat-faced, may be said to be linearly straight. A keeper notch or slot is provided in the intermediate portion of the link, and the notch is denoted generally at 30 and increases and curves laterally and is somewhat V-shaped in plan, the mouth 32 thereof opening through the edge 28. The inner crotch or seat portion of the notch is provided with a circular hole 34 which defines a slight shoulder at 36 which assists in accommodating the loop 38 on the upper end of the flexible element 40 which supports the sinker or weight 42. Thus, by way of the keeper notch and looped flexible hanger element 40, the sinker or weight is detachably or releasably connected with the fishing line.

When the fish A bites or gets hooked on the baitted fish hook, the pulling of the fish on the fish hook will release the weight or sinker 42, and when the latter is tripped and dropped, the fish becomes more securely hooked on the fish hook, because the fish at that moment will not have a sinker to fight. Also, the fisherman, reeling in on the line, is enabled to handle the fish now on the hook much more expeditiously and easily than with the ordinary line equipment in use.

It should also be said that any kind of weight may be used, whether it be regular sinkers, such as are bought over the counter, or old bolts, or burs, or spikes, or stones or anything that weighs the line down, whether such weight or sinkers have any value or not.

Changes in shape, size, material and rearrangement of parts may be resorted to in actual practice without departing from the spirit of the invention or the scope of the invention as claimed.

What is claimed as new is as follows:

For use between adjacent connectable end portions of a fishing line and a hook-equipped leader, a rigid connecting link, said link being linearly straight, flat-faced and provided intermediate its ends with a keeper notch, the mouth of the notch opening through one longitudinal edge, a weight, a sinker for example, a flexible element attached at its lower end to said weight, said flexible element being provided at its upper end with a loop, and said loop being fashioned to be releasably engaged with said link by way of said keeper notch, said notch having a circular hole at its inner end only providing a shoulder for releasable retention of a portion of the loop, said notch being curved and being generally V-shaped in plan and extending generally longitudinally of the length of said structure, the widest part of the V constituting the aforementioned mouth.

References Cited in the file of this patent

UNITED STATES PATENTS

| | | |
|---|---|---|
| 610,989 | James | Sept. 20, 1898 |
| 1,033,464 | Pomeroy | July 23, 1912 |
| 2,735,211 | Grobl et al. | Feb. 21, 1956 |